United States Patent
Kim et al.

(10) Patent No.: US 11,114,850 B2
(45) Date of Patent: Sep. 7, 2021

(54) ELECTROSTATIC DISCHARGE PROTECTION CIRCUIT

(71) Applicant: Silicon Works Co., Ltd., Daejeon (KR)

(72) Inventors: Jae Min Kim, Daejeon (KR); Jae Hyun Lee, Daejeon (KR); Yong Nam Choi, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 41 days.

(21) Appl. No.: 16/717,265

(22) Filed: Dec. 17, 2019

(65) Prior Publication Data

US 2020/0203947 A1 Jun. 25, 2020

(30) Foreign Application Priority Data

Dec. 21, 2018 (KR) .................... 10-2018-0166933

(51) Int. Cl.
*H02H 9/04* (2006.01)

(52) U.S. Cl.
CPC .................. *H02H 9/046* (2013.01)

(58) Field of Classification Search
CPC .............. H02H 9/04; H02H 9/045–047; H01L 27/0248–0255; H01L 27/0266; H01L 27/0285; H01L 27/0292; H01L 27/0296
See application file for complete search history.

(56) References Cited

U.S. PATENT DOCUMENTS

| | | | | | |
|---|---|---|---|---|---|
| 5,784,235 | A | * | 7/1998 | Otomo | H01L 27/0266 361/111 |
| 5,946,175 | A | * | 8/1999 | Yu | H03K 17/08122 361/56 |
| 6,462,601 | B1 | * | 10/2002 | Chang | G11C 5/005 327/310 |
| 6,661,273 | B1 | * | 12/2003 | Lai | H01L 27/0277 327/310 |
| 6,847,511 | B2 | * | 1/2005 | Ohnakado | H01L 27/0266 361/111 |
| 7,692,907 | B2 | * | 4/2010 | Chen | H01L 27/0292 361/56 |

(Continued)

FOREIGN PATENT DOCUMENTS

| | | |
|---|---|---|
| KR | 2003-0002447 A | 1/2003 |
| KR | 2008-0076406 A | 7/2009 |

(Continued)

*Primary Examiner* — Fred E Finch, III
(74) *Attorney, Agent, or Firm* — Polsinelli PC

(57) ABSTRACT

An electrostatic discharge protection circuit includes a first internal circuit formed between a first power line and a first ground line, and configured to operate in a range between a first power and a first ground; a second internal circuit formed between a second power line and a second ground line, and configured to operate in a range between a second power having a level higher than the first power and a second ground; a signal line connecting an output terminal of the first internal circuit and an input terminal of the second internal circuit; and a protection circuit configured to form a bypass path for bypassing a stress due to electrostatic discharge when the electrostatic discharge occurs, between the signal line and the second ground line, to protect a semiconductor device of the second internal circuit from the electrostatic discharge.

20 Claims, 1 Drawing Sheet

(56) References Cited

U.S. PATENT DOCUMENTS

| | | | |
|---|---|---|---|
| 7,796,367 B2* | 9/2010 | Moon | H02H 9/046 |
| | | | 361/56 |
| 7,817,386 B2* | 10/2010 | Ker | H01L 27/0266 |
| | | | 361/56 |
| 8,937,793 B2* | 1/2015 | Hayano | H03K 19/00315 |
| | | | 361/56 |
| 2004/0257728 A1* | 12/2004 | Hu | H01L 27/0266 |
| | | | 361/56 |
| 2005/0135033 A1* | 6/2005 | Kitagawa | H01L 27/0266 |
| | | | 361/91.1 |
| 2006/0189189 A1* | 8/2006 | Jeon | H01L 27/0266 |
| | | | 439/248 |
| 2006/0262472 A1* | 11/2006 | Okushima | H01L 27/0251 |
| | | | 361/91.1 |
| 2007/0058461 A1* | 3/2007 | Morii | G11C 17/165 |
| | | | 365/200 |
| 2009/0201616 A1* | 8/2009 | Moon | H01L 27/0285 |
| | | | 361/56 |
| 2010/0309593 A1* | 12/2010 | Morishita | H02H 9/046 |
| | | | 361/56 |
| 2011/0102962 A1* | 5/2011 | Tanaka | H01L 27/0251 |
| | | | 361/212 |
| 2011/0198678 A1* | 8/2011 | Ker | H01L 27/0285 |
| | | | 257/296 |
| 2011/0205673 A1* | 8/2011 | Okushima | H03K 19/003 |
| | | | 361/56 |
| 2012/0050927 A1* | 3/2012 | Okushima | H03K 19/00315 |
| | | | 361/56 |
| 2013/0161749 A1* | 6/2013 | Kim | H01L 27/0266 |
| | | | 257/355 |
| 2013/0170082 A1* | 7/2013 | Yeh | H02H 9/046 |
| | | | 361/56 |
| 2013/0235498 A1* | 9/2013 | Lai | H01L 27/0292 |
| | | | 361/56 |
| 2013/0321961 A1* | 12/2013 | Lin | H02H 9/046 |
| | | | 361/56 |
| 2013/0321962 A1* | 12/2013 | Lai | H01L 27/0292 |
| | | | 361/56 |
| 2013/0342940 A1* | 12/2013 | Taghizadeh Kaschani | |
| | | | H02H 9/046 |
| | | | 361/56 |
| 2017/0294431 A1* | 10/2017 | Hwang | H01L 21/28052 |
| 2019/0393866 A1* | 12/2019 | Wu | H03K 19/00361 |

FOREIGN PATENT DOCUMENTS

| | | |
|---|---|---|
| KR | 2013-0028948 A | 3/2013 |
| KR | 10-1464334 B | 11/2014 |
| KR | 2016-0110821 A | 9/2016 |

* cited by examiner

ELECTROSTATIC DISCHARGE PROTECTION CIRCUIT

CROSS-REFERENCE TO RELATED APPLICATIONS

The present application claims priority to Korean Application No. 10-2018-0166933, filed Dec. 21, 2018 the contents of which are hereby incorporated by reference as set for fully herein.

BACKGROUND

1. Technical Field

Various embodiments generally relate to an electrostatic discharge protection circuit, and more particularly, to a technology for protecting a semiconductor device of an internal circuit from electrostatic discharge.

2. Related Art

In general, electrostatic discharge may occur momentarily by contact with a human body, contact with measuring equipment, contact with an external ground, or the like. Electrostatic discharge may destroy a semiconductor device of an integrated circuit or degrade the performance thereof, thereby making it impossible for the semiconductor device to operate.

Under this situation, the development of technology capable of protecting a semiconductor device from electrostatic discharge is in progress.

An integrated circuit may include various internal circuits, and the respective internal circuits may operate in different power level ranges.

For example, an internal circuit may be a level shift circuit. The level shift circuit may use an LDMOS (laterally diffused metal oxide semiconductor) device which is formed with a thin gate oxide to sufficiently increase driving current in correspondence to an input signal of a low voltage.

However, a disadvantage may be caused in that, since the gate oxide is thin, the LDMOS device is vulnerable to CDM (charged device model) electrostatic discharge. Therefore, in order to cope with such a disadvantage, there is a demand for a circuit capable of protecting the thin gate oxide of the LDMOS device.

SUMMARY

Various embodiments are directed to an electrostatic discharge protection circuit capable of protecting a semiconductor device of an internal circuit by forming a bypass path when electrostatic discharge occurs.

In an embodiment, an electrostatic discharge protection circuit may include: a first internal circuit formed between a first power line and a first ground line, and configured to operate in a range between a first power and a first ground; a second internal circuit formed between a second power line and a second ground line, and configured to operate in a range between a second power having a level higher than the first power and a second ground; a signal line connecting an output terminal of the first internal circuit and an input terminal of the second internal circuit; and a protection circuit configured to form a bypass path for bypassing a stress due to electrostatic discharge when the electrostatic discharge occurs, between the signal line and the second ground line, to protect a semiconductor device of the second internal circuit from the electrostatic discharge.

In an embodiment, an electrostatic discharge protection circuit may include: an inverter formed between a first power line and a first ground line, and configured to operate in a range between a first power and a first ground; a level shift circuit formed between a second power line and a second ground line, and configured to operate in a range between a second power having a level higher than the first power and a second ground; a signal line connecting an output terminal of the inverter and an input terminal of the level shift circuit; a first protection circuit configured to form a first bypass path that bypasses a stress due to electrostatic discharge, between the signal line and the second ground line when the electrostatic discharge occurs at the output terminal of the inverter, to protect a semiconductor device of the level shift circuit; and a second protection circuit configured to form a second bypass path that bypasses a stress due to electrostatic discharge, between the signal line and the second ground line when the electrostatic discharge occurs at the input terminal of the level shift circuit, to protect the semiconductor device of the level shift circuit.

In an embodiment, an electrostatic discharge protection circuit may include: first and second internal circuits configured to be driven in different voltage ranges; and first and second protection circuits configured to form first and second bypass paths for bypassing a stress due to electrostatic discharge, when the electrostatic discharge occurs between the first and second internal circuits, to protect semiconductor devices of the first and second internal circuits.

According to the embodiments, by forming a path for bypassing a stress due to electrostatic discharge when the electrostatic discharge occurs, it is possible to protect a semiconductor device from the electrostatic discharge.

Also, according to the embodiments, it is possible to prevent a gate oxide layer of a semiconductor device of an internal circuit from being destroyed due to CDM electrostatic discharge that may occur between internal circuits operating in different voltage ranges.

DETAILED DESCRIPTION

Figure 1:
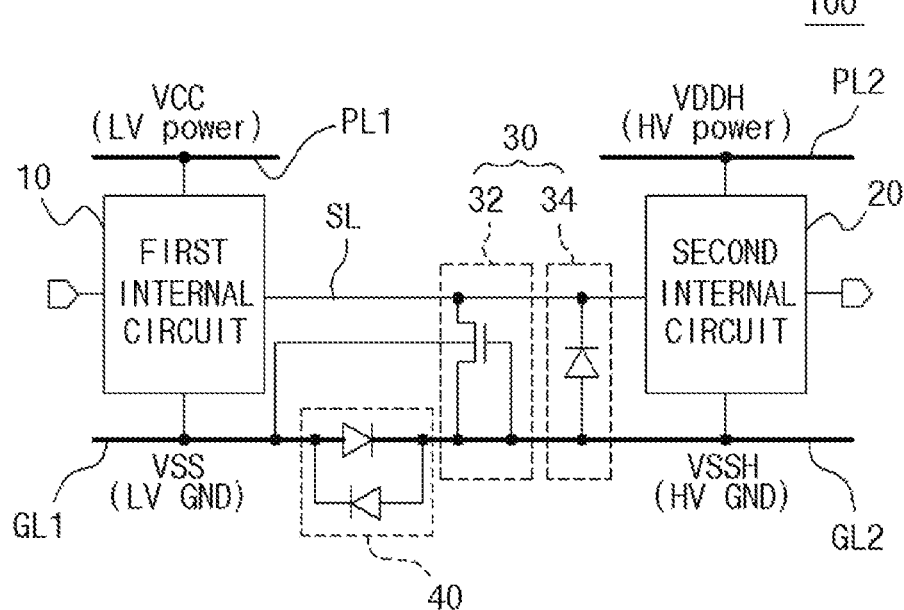
FIG. 1 is a circuit diagram illustrating a representation of an example of an electrostatic discharge protection circuit in accordance with an embodiment.

Hereinafter, embodiments of the disclosure will be described in detail with reference to the accompanying drawings. The terms used herein and in the claims shall not be construed as being limited to general or dictionary meanings and shall be interpreted based on the meanings and concepts corresponding to technical aspects of the disclosure.

Embodiments described herein and configurations illustrated in the drawings are preferred embodiments of the disclosure, but they do not represent all of the technical features of the disclosure. Thus, there may be various equivalents and modifications that can be made thereto at the time of filing the present application.

FIG. 1 is a circuit diagram illustrating a representation of an example of an electrostatic discharge protection circuit in accordance with an embodiment.

Referring to FIG. 1, an electrostatic discharge protection circuit 100 includes a first internal circuit 10, a second internal circuit 20, a signal line SL, a protection circuit 30, and a back-to-back diode 40.

The first internal circuit 10 is formed between a first power line PL1 and a first ground line GL1, and operates in a range between a first power VCC of the first power line PL1 and a first ground VSS of the first ground line GL1. For instance, the first internal circuit 10 may be an inverter or a buffer.

The second internal circuit 20 is formed between a second power line PL2 and a second ground line GL2, and operates in a range between a second power VDDH of the second power line PL2 and a second ground VSSH of the second ground line GL2. The second power VDDH has a voltage level higher than the first power VCC. For instance, the second internal circuit 20 may be a level shift circuit.

The signal line SL connects an output terminal of the first internal circuit 10 and an input terminal of the second internal circuit 20. An output signal of the first internal circuit 10 is transferred to the input terminal of the second internal circuit 20 through the signal line SL.

The protection circuit 30 forms a bypass path for bypassing a stress due to the electrostatic discharge, between the signal line SL and the second ground line GL2 when electrostatic discharge occurs, and thereby, protects a semiconductor device of the second internal circuit 20 from the electrostatic discharge.

The protection circuit 30 may include first and second protection circuits 32 and 34 which form first and second bypass paths.

The first protection circuit 32 forms the first bypass path that bypasses a stress due to CDM (charged device model) electrostatic discharge, between the signal line SL and the second ground line GL2 when the CDM electrostatic discharge occurs at the output terminal of the first internal circuit 10.

The first protection circuit 32 may be configured by a semiconductor device which has the same breakdown voltage as a semiconductor device of the first internal circuit 10.

The first protection circuit 32 may be configured using an NMOS (N-channel metal oxide semiconductor). The NMOS has a gate which is connected to the second ground line GL2 and a body which is connected to the first ground line GL1.

The second protection circuit 34 forms the second bypass path that bypasses a stress due to CDM electrostatic discharge, between the signal line SL and the second ground line GL2 when the CDM electrostatic discharge occurs at the input terminal of the second internal circuit 20.

The second protection circuit 34 may be configured by a semiconductor device which has the same breakdown voltage as the second internal circuit 20.

The second protection circuit 34 may be configured using a diode. The diode has an anode which is connected to the second ground line GL2 and a cathode which is connected to the signal line SL.

The first protection circuit 32 may be configured by an NMOS which has a breakdown voltage the same as that of the first internal circuit 10 and lower than that of the second protection circuit 34, and the second protection circuit 34 may be configured by a diode which has a breakdown voltage the same as that of the second internal circuit 20 and higher than that of the first protection circuit 32.

The second internal circuit 20 may be a level shift circuit which converts an input signal of a low voltage level into an output signal of a high voltage level. The protection circuit 30 protects the semiconductor device which uses a thin gate oxide connected with the input terminal of the level shift circuit, from CDM electrostatic discharge that may occur in the signal line SL by the first internal circuit 10 or the second internal circuit 20. The semiconductor device may be a device which has a low gate source voltage and a high breakdown voltage. For example, an LDMOS (laterally diffused metal oxide semiconductor) or an EDMOS (enhancement driver depletion load MOS) may be exemplified.

The LDMOS as a majority carrier device is a representative lateral power device with fast switching response and high input impedance. The most important factors in the design of a power device are breakdown voltage and on-resistance. Lowering the concentration of a drift region improves a breakdown voltage but increases on-resistance. Conversely, raising the concentration of a drift region decreases on-resistance but lowers a breakdown voltage. As such, there is a trade-off relationship between breakdown voltage and on-resistance, and it is substantially important to design a power device to have smaller on-resistance at the same breakdown voltage.

The level shift circuit may employ the above-described LDMOS device to sufficiently increase driving current in response to an input signal of a low voltage. Since the LDMOS device is vulnerable to CDM electrostatic discharge that may occur between internal circuits operating in different voltage ranges, the first and second protection circuits 32 and 34 form the first and second bypass paths for bypassing CDM electrostatic discharge when the CDM electrostatic discharge occurs, thereby preventing the gate oxide of the LDMOS device from being destroyed.

The back-to-back diode 40 is formed between the first ground line GL1 and the second ground line GL2. The back-to-back diode 40 helps electrostatic discharge to be organically discharged to a ground terminal (not illustrated) via the first and second ground lines GL1 and GL2. In addition, the back-to-back diode 40 plays the role of matching the high voltage region and the low voltage region of the first and second internal circuits 10 and 20 and thereby blocking noise between the two regions.

Figure 2:
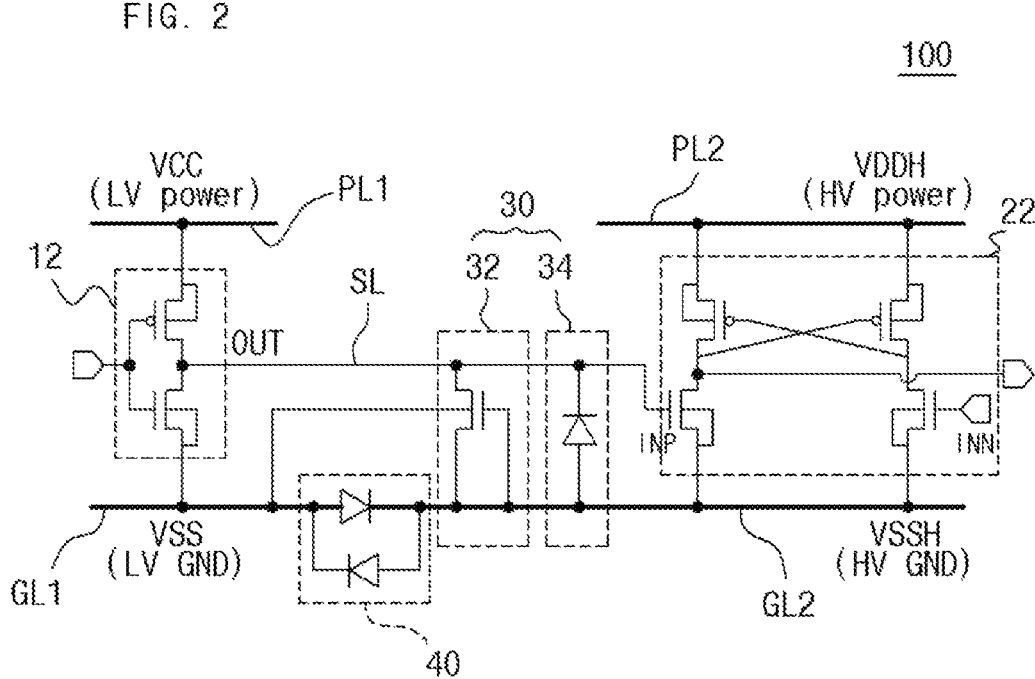
FIG. 2 is a circuit diagram illustrating a representation of an example of an electrostatic discharge protection circuit which is applied to a level shift circuit, in accordance with an embodiment.

FIG. 2 is a circuit diagram illustrating a representation of an example of an electrostatic discharge protection circuit which is applied to a level shift circuit, in accordance with an embodiment.

Referring to FIG. 2, an electrostatic discharge protection circuit 100 includes an inverter 12, a level shift circuit 22, a signal line SL, a protection circuit 30, and a back-to-back diode 40.

The inverter 12 is formed between a first power line PL1 and a first ground line GL1, and operates in a range between a first power VCC of the first power line PL1 and a first ground VSS of the first ground line GL1.

The inverter 12 includes a pull-up device and a pull-down device which pull-up and pull-down drive an output terminal in response to a signal applied to an input terminal. The pull-up device and the pull-down device are driven in a voltage range between the first power VCC and the first ground VSS.

The level shift circuit 22 is formed between a second power line PL2 and a second ground line GL2, and operates in a range between a second power VDDH of the second power line PL2 and a second ground VSSH of the second ground line GL2. The second power VDDH has a voltage level higher than the first power VCC.

The level shift circuit 22 includes a semiconductor device which drives an output terminal in a voltage range between the second power VDDH and the second ground VSSH in response to a signal applied to an input terminal from the inverter 12. The semiconductor device may employ an LDMOS or EDMOS device to increase driving current in response to the signal of a low voltage applied from the inverter 12.

The signal line SL connects the output terminal of the inverter 12 and the input terminal of the level shift circuit 22. An output signal of the inverter 12 is transferred to the gate of the LDMOS or EDMOS device of the level shift circuit 22 through this signal line SL.

A first protection circuit 32 forms a first bypass path that bypasses a stress due to CDM electrostatic discharge, between the signal line SL and the second ground line GL2 when the CDM electrostatic discharge occurs at the output terminal of the inverter 12, and thereby, protects a gate oxide of the LDMOS or EDMOS device of the level shift circuit 22.

A second protection circuit 34 forms a second bypass path that bypasses a stress due to CDM electrostatic discharge, between the signal line SL and the second ground line GL2 when the CDM electrostatic discharge occurs at the input terminal of the level shift circuit 22, and thereby, protects the gate oxide of the LDMOS or EDMOS device of the level shift circuit 22.

Further describing CDM electrostatic discharge, in an integrated circuit including a plurality of internal circuits, in addition to a stress due to electrostatic discharge through an external input/output pad, a stress due to the CDM electrostatic discharge may be caused between internal circuits driven in different voltage ranges.

For example, a lot of electric charges may exist in the level shift circuit 22 driven in a high voltage range because a high voltage is frequently applied to the semiconductor device therein, and a large amount of electrostatic charges which may cause CDM static electricity may exist in the signal line SL between the inverter 12 and the level shift circuit 22. In the case where a ground voltage is applied to the second ground line GL2, electrons may be discharged via the level shift circuit 22 in an instant. If this is the case, the thin gate oxide of the LDMOS or EDMOS device is highly likely to be easily destroyed by a stress due to the CDM electrostatic discharge.

In consideration of this fact, the first and second protection circuits 32 and 34 form the first and second bypass paths that bypass a stress due to the CDM electrostatic discharge, between the signal line SL and the second ground line GL2 when the CDM electrostatic discharge occurs in the signal line SL by the inverter 12 or the level shift circuit 22, and thereby, prevent the gate oxide of the LDMOS or EDMOS device of the level shift circuit 22 from being destroyed by the stress due to the CDM electrostatic discharge.

The first protection circuit 32 may be configured by an NMOS which has the same breakdown voltage as the pull-up device and the pull-down device of the inverter 12. The gate of the NMOS is connected to the second ground line GL2, and the body of the NMOS is connected to the first ground line GL1.

The second protection circuit 34 may be configured by a diode which has the same breakdown voltage as the semiconductor device of the level shift circuit 22. The anode of the diode is connected to the second ground line GL2, and the cathode of the diode is connected to the signal line SL.

The back-to-back diode 40 may be formed between the first ground line GL1 and the second ground line GL2. The back-to-back diode 40 helps electrostatic discharge to be organically discharged to a ground terminal via the first and second ground lines GL1 and GL2. In addition, the back-to-back diode 40 may play the role of matching the inverter 12 and the level shift circuit 22 driven in different voltage ranges and thereby blocking noise between the inverter 12 and the level shift circuit 22.

As is apparent from the above descriptions, according to the embodiments, by forming a path for bypassing a stress due to electrostatic discharge when the electrostatic discharge occurs, it is possible to protect a semiconductor device from the electrostatic discharge.

Also, according to the embodiments, it is possible to prevent a gate oxide layer of a semiconductor device of an internal circuit from being destroyed due to CDM electrostatic discharge that may occur between internal circuits operating in different voltage ranges.

While various embodiments have been described above, it will be understood to those skilled in the art that the embodiments described are by way of example only. Accordingly, the disclosure described herein should not be limited based on the described embodiments.

What is claimed is:

1. An electrostatic discharge protection circuit comprising:
   a first internal circuit formed between a first power line and a first ground line, and configured to operate in a range between a first power and a first ground;
   a second internal circuit formed between a second power line and a second ground line, and configured to operate in a range between a second power having a level higher than the first power and a second ground;
   a signal line connecting an output terminal of the first internal circuit and an input terminal of the second internal circuit; and
   a protection circuit configured to form a bypass path for bypassing a stress due to electrostatic discharge by a semiconductor device which has the same breakdown voltage as the first internal circuit when the electrostatic discharge occurs, between the signal line and the second ground line, to protect a semiconductor device of the second internal circuit from the electrostatic discharge.

2. The electrostatic discharge protection circuit according to claim 1, wherein the protection circuit comprises:
   a first protection circuit configured to form a first bypass path that bypasses a stress due to electrostatic discharge, between the signal line and the second ground line when the electrostatic discharge occurs at the output terminal of the first internal circuit; and
   a second protection circuit configured to form a second bypass path that bypasses a stress due to electrostatic discharge, between the signal line and the second ground line when the electrostatic discharge occurs at the input terminal of the second internal circuit.

3. The electrostatic discharge protection circuit according to claim 2, wherein the first protection circuit is configured by the semiconductor device which has the same breakdown voltage as the first internal circuit.

4. The electrostatic discharge protection circuit according to claim 2, wherein the first protection circuit is configured using an NMOS (N-channel metal oxide semiconductor).

5. The electrostatic discharge protection circuit according to claim 4, wherein the NMOS has a gate which is connected to the second ground line and a body which is connected to the first ground line.

6. The electrostatic discharge protection circuit according to claim 2, wherein the second protection circuit is configured by a semiconductor device which has the same breakdown voltage as the second internal circuit.

7. The electrostatic discharge protection circuit according to claim 6, wherein the second protection circuit is configured using a diode, and the diode has an anode which is connected to the second ground line and a cathode which is connected to the signal line.

8. The electrostatic discharge protection circuit according to claim 2,
wherein the first protection circuit is configured by an NMOS which has a breakdown voltage the same as the first internal circuit and lower than the second protection circuit, and
wherein the second protection circuit is configured by a diode which has a breakdown voltage the same as the second internal circuit and higher than the first protection circuit.

9. The electrostatic discharge protection circuit according to claim 1, wherein the second internal circuit is a level shift circuit, and the protection circuit protects a semiconductor device which uses a thin gate oxide of the level shift circuit, from electrostatic discharge likely to occur in the signal line.

10. The electrostatic discharge protection circuit according to claim 1, further comprising:
a back-to-back diode formed between the first ground line and the second ground line.

11. An electrostatic discharge protection circuit comprising:
an inverter formed between a first power line and a first ground line, and configured to operate in a range between a first power and a first ground;
a level shift circuit formed between a second power line and a second ground line, and configured to operate in a range between a second power having a level higher than the first power and a second ground;
a signal line connecting an output terminal of the inverter and an input terminal of the level shift circuit;
a first protection circuit configured to form a first bypass path that bypasses a stress due to electrostatic discharge by a semiconductor device which has the same breakdown voltage as the inverter, between the signal line and the second ground line when the electrostatic discharge occurs at the output terminal of the inverter, to protect a semiconductor device of the level shift circuit; and
a second protection circuit configured to form a second bypass path that bypasses a stress due to electrostatic discharge, between the signal line and the second ground line when the electrostatic discharge occurs at the input terminal of the level shift circuit, to protect the semiconductor device of the level shift circuit.

12. The electrostatic discharge protection circuit according to claim 11, wherein the first protection circuit is configured by an NMOS which has the same breakdown voltage as the semiconductor device of the inverter.

13. The electrostatic discharge protection circuit according to claim 11, wherein the NMOS has a gate which is connected to the second ground line and a body which is connected to the first ground line.

14. The electrostatic discharge protection circuit according to claim 11, wherein the second protection circuit is configured by a diode which has the same breakdown voltage as the semiconductor device of the level shift circuit.

15. The electrostatic discharge protection circuit according to claim 14, wherein the diode has an anode which is connected to the second ground line and a cathode which is connected to the signal line.

16. The electrostatic discharge protection circuit according to claim 11, further comprising:
a back-to-back diode formed between the first ground line and the second ground line.

17. The electrostatic discharge protection circuit according to claim 11, wherein the first and second protection circuits protect a semiconductor device which uses a thin gate oxide of the level shift circuit, from electrostatic discharge.

18. An electrostatic discharge protection circuit comprising:
first and second internal circuits configured to be driven in different voltage ranges; and
first and second protection circuits configured to form first and second bypass paths for bypassing a stress due to electrostatic discharge by a semiconductor device which has the same breakdown voltage as a semiconductor device of an internal circuit driven in a lower voltage range between the first and second internal circuits, when the electrostatic discharge occurs between the first and second internal circuits, to protect semiconductor devices of the first and second internal circuits.

19. The electrostatic discharge protection circuit according to claim 18, wherein the first protection circuit is configured by an NMOS which has the same breakdown voltage as the semiconductor device of the internal circuit driven in the lower voltage range between the first and second internal circuits, the NMOS having a gate which is connected to a ground line of a high voltage and a body which is connected to a ground line of a low voltage.

20. The electrostatic discharge protection circuit according to claim 19, wherein the second protection circuit is configured by a diode which has the same breakdown voltage as the semiconductor device of the internal circuit driven in a higher voltage range between the first and second internal circuits, the diode having an anode which is connected to a ground line of a high voltage and a cathode which is connected to a signal line interconnecting input and output signals of the first and second internal circuits.

* * * * *